R. L. CABALLERO.
APPARATUS ENABLING PHOTOGRAPHIC PLATES TO BE DEVELOPED IN DAYLIGHT.
APPLICATION FILED OCT. 6, 1909.
1,079,288.
Patented Nov. 18, 1913.
2 SHEETS—SHEET 1.
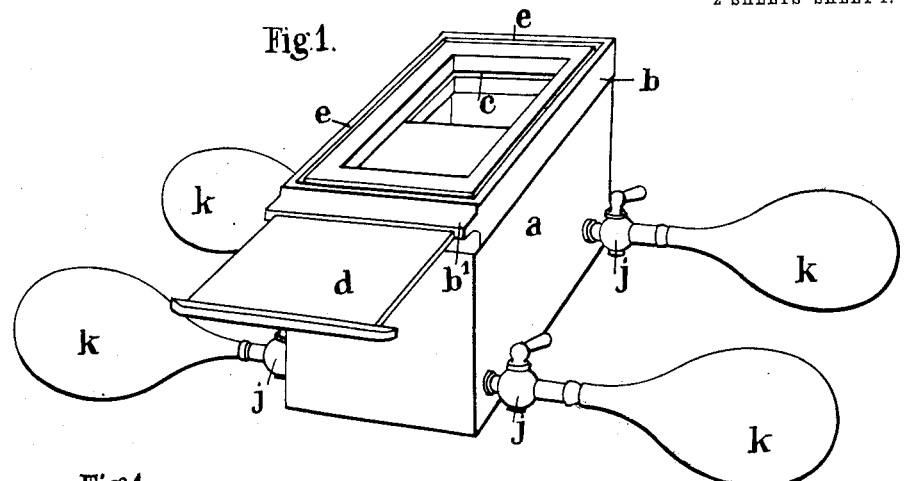
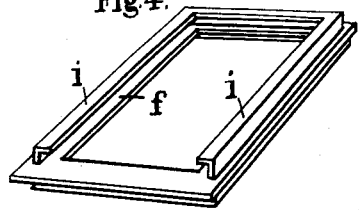
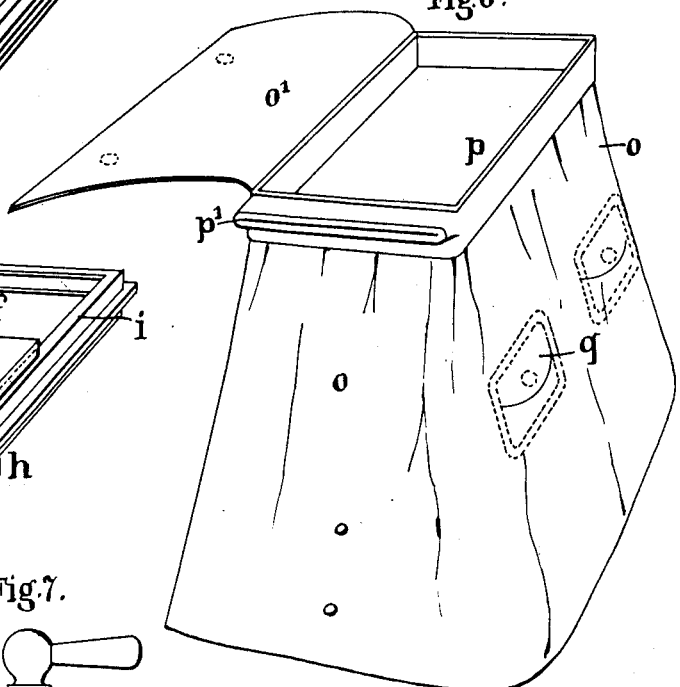
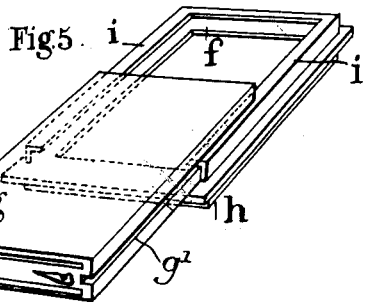
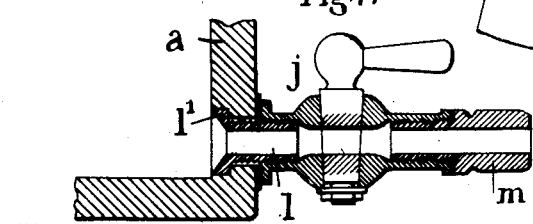
INVENTOR
Rudolphe Luchsinger Caballero
BY
Howson and Howson
his ATTORNEYS
WITNESSES R. L. CABALLERO.
APPARATUS ENABLING PHOTOGRAPHIC PLATES TO BE DEVELOPED IN DAYLIGHT.
APPLICATION FILED OCT. 6, 1909.
1,079,288. Patented Nov. 18, 1913.
2 SHEETS—SHEET 2.
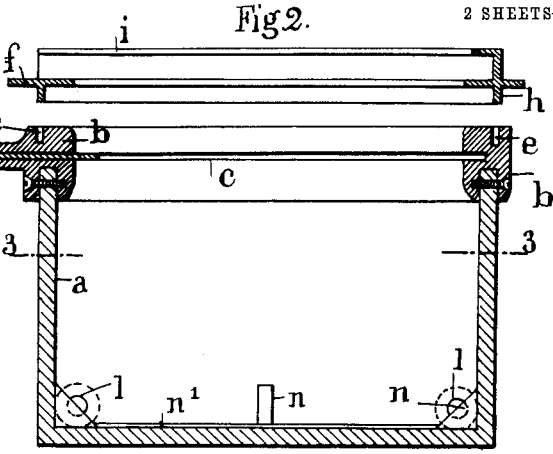
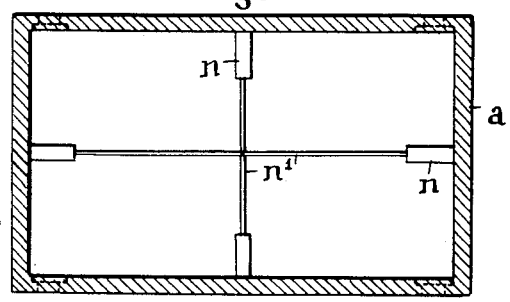
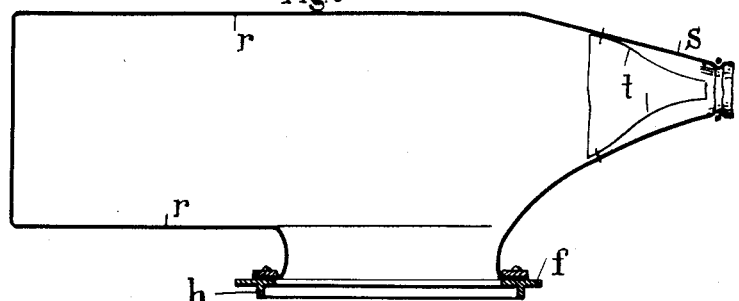
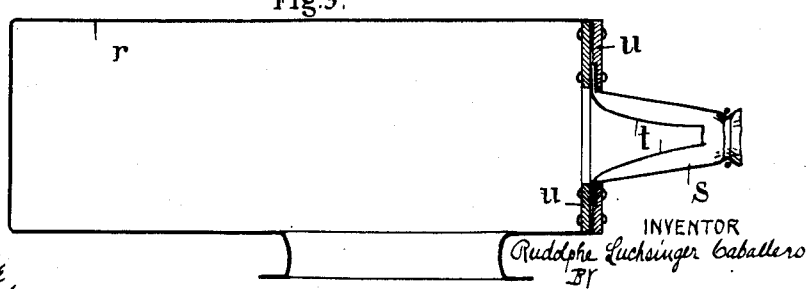

UNITED STATES PATENT OFFICE.

RUDOLPHE LUCHSINGER CABALLERO, OF BRIGHTON, ENGLAND.

APPARATUS ENABLING PHOTOGRAPHIC PLATES TO BE DEVELOPED IN DAYLIGHT.

1,079,288.  Specification of Letters Patent.  Patented Nov. 18, 1913.

Application filed October 6, 1909. Serial No. 521,414.

*To all whom it may concern:*

Be it known that I, RUDOLPHE LUCHSINGER CABALLERO, a citizen of Switzerland, residing at Brighton, England, Great Britain, have invented certain new and useful Improvements in Apparatus Enabling Photographic Plates to be Developed in Daylight, of which the following is a specification, reference being had therein to the accompanying drawings.

The present invention has for its object an apparatus enabling ordinary photographic plates (gelatino bromid silver plates) isochromatic or other plates to be developed in daylight that is to say without having recourse to a dark room.

The invention will now be described with reference to the accompanying drawing in which:—

Figure 1 is a perspective view of the apparatus as a whole. Fig. 2 is a longitudinal vertical section through the apparatus; Fig. 2$^{bis}$ is a fragmentary section through the shutter nose showing the skirt adjusted and the shutter in open position. Fig. 3 is a horizontal section on the line 3—3 in Fig. 2. Figs. 4 and 5 are perspective views of a frame serving for the direct insertion into the apparatus of the plates inclosed in a double photographic frame or slide. Fig. 6 is a perspective view of an envelop for inclosing the apparatus. Fig. 6$^{bis}$ is a view corresponding to Fig. 2$^{bis}$ but drawn to a larger scale and showing the shutter in closed position. Fig. 7 is a detail view to a larger scale of the lower part of the apparatus. Figs. 8 and 9 are longitudinal sections through modified forms of arm bags adjustable upon the top frame of the tank.

This apparatus comprises a receptacle $a$ of glass or other transparent material of nonactinic color which constitutes the tank proper and in which the various operations necessitated by the development of photographic plates or prints are carried out. At its upper part this tank comprises a flange or a fitted frame $b$ of hard rubber, metal or similar material which is preferably opaque to light. Internally this flange $b$ is formed with a groove $c$ in which there slides a shutter $d$ which can be inserted at one of the ends of the frame $b$ which for this object is provided with a nose $b'$. As hereinafter explained the shutter $d$ is formed of opaque or transparent material according to the kind of operation to be effected. The frame or flange $b$ likewise comprises at its upper part on its four sides a vertical groove $e$ in which there is fitted a frame $f$ for the direct introduction of plates into the tank. This frame $f$ which as shown in Figs. 4 and 5 may be constructed for the reception of a double spring frame or slide $g$ containing the plates to be developed, as shown in Fig. 2 comprises a flange $h$ which exactly corresponds with the groove $c$ in the frame $b$ and a guide $i$ in which the double slide or frame $g$ is able to slide by means of its groove $g'$.

At its lower part and on its sides the tank $a$ is provided with cocks $j$ arranged as close as possible to the angles formed by the bottom and the vertical walls and serving to place it in communication with indiarubber bulbs $k$ containing the various liquids required in the operations of development and which can be injected into the interior of the tank at will.

Fig. 7 shows in vertical section and to a larger scale the method of fixing the cocks $j$ to the tank $a$. These cocks $j$ are screwed onto a tube $l$ comprising a collar $l'$ which bears against a corresponding shoulder formed internally in the wall of the tank $a$ and at a level with the bottom of this tank. In order to facilitate the return of the liquid into the bulb $k$ the tube $l$ is flared internally so as to bring it at a level with the bottom of the tank $a$. The cock is fitted to the tube $l$ with a tight joint by means of a leather or other similar washer. On the opposite side the cock $j$ comprises a connection $m$ to which the rubber bulb $k$ is fitted; this bulb has a capacity suited to that of the tank $a$.

The apparatus represented by way of example in Fig. 2 is provided with four bulbs the first intended to contain the developer, the second the washing water, the third the fixing bath while the fourth bulb which is an auxiliary bulb contains a solution for weakening or strengthening the plate or print before fixing if necessary. Nevertheless it should be noted that the number of cocks may be increased or diminished as certain methods of development necessitate a larger or smaller number of baths. The tank need not comprise more than a single cock in which case the bulbs containing the various baths are fixed there in turn.

The bottom of the tank $a$ is provided with a support serving to deaden the fall of the plate and prevent it from contacting with the lower wall which constitutes the bottom of the tank; it also serves to facilitate the action of the bath and prevent any scratching of the plate. In the example illustrated this support is formed of four triangular tappets $n$ of indiarubber or other appropriate material fixed to the extremities of a cross piece of wire $n'$ which might likewise be arranged in such a manner that the tappets $n$ are constituted by the extremities of the cross piece appropriately bent and covered with indiarubber.

In order to enable the light inside the tank $a$ to be diminished or completely cut off it may be provided with an envelop forming a skirt which consists of a piece of fabric or leather $o$ or any other material opaque to light and fixed to an elastic band $p$ which forms a belt and exactly follows the profile of the frame $b$ on the tank $a$. In order to enable the shutter $d$ to be operated the band $p$ is provided with an opening comprising a sleeve $p'$ of red or black velvet (Fig. 6$^{bis}$) fixed to the interior of the skirt in such a manner that the nose $b'$ of the frame on the tank is incased in the sleeve which at its extremity comprises an elastic cord of relatively large size which serves not only to hold the extremity of the shutter $d$ in the opening of the nose $b'$ when the plate is entering the tank but also to prevent any infiltration of white light into the tank at this moment. The band likewise comprises a flap $o'$ capable of producing complete obscurity in the tank and in this case the transparency of the bottom may likewise be eliminated by folding back upon themselves the edges of the skirt.

Opposite the cocks $j$ the skirt $o$ is provided with apertures formed by semi-circular incisions opposite which there are fixed inside the skirt flaps of elastic fabric $q$ comprising a circular aperture serving for the passage of the sockets $m$ and thus providing around the latter a perfect joint which opposes any infiltration of light. It will of course be understood that the skirt should be sufficiently ample at its lower part to permit of operating from the exterior the various cocks $j$ when the latter engage in the openings in the elastic flaps and remain covered by the skirt that is to say when the latter is employed, in the manner hereinafter described for producing absolute obscurity inside the apparatus.

It will be understood that in order to introduce a plate into the tank it is only necessary to place the frame $f$ in the groove $e$ and to engage the double slide $g$ in the guide $i$. After the corresponding shutter has been withdrawn from the slide $g$ it is only necessary to open the shutter $d$ on the tank and actuate the spring of the slide $g$ corresponding to the plate to be released in order to cause the latter to fall on to the elastic support $n$ arranged at the bottom of the tank.

In order to proceed to the development of ordinary plates the apparatus is covered with the skirt $o$ without folding it under the tank and without passing the sockets through the openings in the elastic flaps $q$; in this case the non-actinic shutter $d$ is used for closing the tank. In order to observe the development of the plate it is only necessary for the operator to arrange the skirt around his face in order that the shadow produced by the skirt may bring out all the details of the action of the developer. The operator will then perceive the plate by reflection through the non-actinic shutter $d$ the light from the outside passing through the transparent non-actinic walls of the tank for illuminating the plate. If, on the other hand the walls of the tank are left covered by the skirt $o$ the examination of the plate by transparency will take place by looking either through the bottom of the tank with the face to the light or through the shutter $d$.

If plates requiring complete darkness and constant development are to be treated it will only be necessary to replace the transparent curtain $d$ by a shutter opaque to light then to arrange the skirt $o$ taking care to fold its edges beneath the tank, of course after the sockets of the cocks have been passed through the openings in the elastic flaps $q$.

Instead of being arranged for the reception of a double slide as in the example illustrated in Figs. 4 and 5 the frame $f$ may be arranged as shown in Fig. 8. With this arrangement the frame $f$ instead of comprising a guide for the reception of the double slide $g$ is provided with a bag of elongated form constituted by pieces of fabric or pliable leather $r$ suitably assembled and fixed to the frame $f$ in any appropriate manner for preventing the infiltration of light to the interior. At either one or both of its extremities this bag forms a sort of sleeve $s$ through the opening in which the hand can be passed. In order to avoid any infiltration of light a wrist piece $t$ of elastic fabric is fixed inside the sleeve $s$.

Although the frame for the bag may comprise two sleeves $s$ it should be noted that one is sufficient as owing to the pliability of the fabric or leather of which the bag is formed it is possible by using the free hand to effect the various manipulations protected from any white light.

With the object of imparting a certain degree of rigidity to the bag the side comprising the sleeve $s$ may be constituted by two small plates $u$ (Fig. 9) pressing the edges of the fabric forming the body of the skirt and the sleeve intended for the passage of the hand. Such an arrangement of a bag frame enables all kinds of double or single photographic slides, boxes or magazine frames to be loaded and unloaded in perfect safety, and owing to the pliability of the fabric or of the leather constituting the bag or envelop to remove in perfect safety either a plate from a slide or box of any kind, or a film pack from its envelop and to introduce it into the tank face upward or face downward as desired. When once the tank has been closed by the shutter *d* whether transparent or opaque the frame *f* is removed in order to follow the development as explained above.

It will of course be understood that the invention is not strictly confined to the construction represented which is given by way of example only and that it may comprise various detail modifications which do not affect its principle. Thus the edge of the tank formed by the frame *b* instead of being fitted thereto might be of the same material as the receptacle *a* and molded at the same time as the body of the tank. Then again the tank as a whole could be formed of any appropriate opaque material with a view for use for developments necessitating absolute darkness.

What I claim and desire to secure by Letters Patent of the United States is:—

1. A photographic developing apparatus, comprising a developing tank with ports in its sides adjacent the bottom thereof, and means for introducing suitable liquids therethrough for the developing process, a casing permanently secured to the upper edge of said tank and recessed on its upper face to form a groove, a horizontally slotted nose on said casing, a shutter sliding in said casing and projecting at its handle end through the slot in said nose, said shutter forming a closure for said tank, in combination with a frame provided with a depending flange adapted to enter said groove, said frame having an opening therein through which a plate may be introduced into the tank, together with means in connection with said frame for preventing the exposure of said plate to light during its removal from its holder.

2. A photographic developing apparatus, comprising a developing tank with ports in its sides adjacent the bottom thereof, and means for introducing suitable liquids therethrough for the developing process, a casing permanently secured to the upper edge of said tank and recessed on its upper face to form a groove, a shutter sliding in said casing to form a closure for said tank, in combination with a frame provided with a depending flange adapted to enter said groove, said frame having an opening therein through which a plate may be introduced into the tank, together with means in connection with said frame for preventing the exposure of said plate to light during its removal from its holder, together with a flexible skirt to cover said tank having an elastic band at its upper edge slotted to permit the passage of the shutter therethrough, substantially as described.

In testimony whereof I have signed my name to this specification, in the presence of two subscribing witnesses.

RUDOLPHE LUCHSINGER CABALLERO.

Witnesses:
R. WESTACOTT,
H. D. JAMESON.